United States Patent
Latva-Aho et al.

(10) Patent No.: US 9,131,421 B2
(45) Date of Patent: Sep. 8, 2015

(54) METHODS AND APPARATUS FOR HANDOVER MANAGEMENT

(71) Applicant: Nokia Siemens Networks Oy, Espoo (FI)

(72) Inventors: Matti Latva-Aho, Oulu (FI); Kapuruhamy Manosha, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 209 days.

(21) Appl. No.: 13/835,576

(22) Filed: Mar. 15, 2013

(65) Prior Publication Data

US 2014/0274053 A1 Sep. 18, 2014

(51) Int. Cl.
*H04W 36/00* (2009.01)
*H04W 36/30* (2009.01)
*H04W 36/24* (2009.01)

(52) U.S. Cl.
CPC .............. *H04W 36/30* (2013.01); *H04W 36/24* (2013.01); *Y02B 60/50* (2013.01)

(58) Field of Classification Search
CPC ..... H04W 36/30; H04W 36/32; H04W 36/18; H04W 16/12; H04W 24/00; H04W 28/08; H04W 88/06; H04W 80/04; H04W 84/12; H04L 2012/5607
USPC ........... 455/436–444, 451–453, 552.1, 553.1, 455/41.2, 41.3; 370/310.2, 328, 331–334, 370/338
See application file for complete search history.

(56) References Cited

U.S. PATENT DOCUMENTS

| | | | |
|---|---|---|---|
| 4,670,899 A * | 6/1987 | Brody et al. .................. | 455/453 |
| 5,241,688 A * | 8/1993 | Arora ............................. | 455/502 |
| 6,445,924 B1 * | 9/2002 | Rasanen ....................... | 455/437 |
| 7,509,129 B2 * | 3/2009 | Sinivaara ...................... | 455/453 |
| 8,169,933 B2 * | 5/2012 | Srinivasan et al. ............ | 370/253 |
| 8,270,975 B2 * | 9/2012 | Kim et al. ..................... | 455/436 |
| 8,301,184 B2 * | 10/2012 | Byun et al. .................... | 455/525 |
| 2005/0176440 A1 * | 8/2005 | Sang et al. .................... | 455/453 |
| 2006/0035640 A1 * | 2/2006 | Karaoguz et al. ............. | 455/437 |
| 2009/0017823 A1 * | 1/2009 | Sachs et al. ................... | 455/437 |
| 2010/0278141 A1 | 11/2010 | Choi-Grogan et al. ....... | 370/331 |
| 2011/0086641 A1 | 4/2011 | Guvenc et al. ................ | 455/437 |
| 2011/0170518 A1 * | 7/2011 | Randriamasy et al. ....... | 370/331 |
| 2011/0244863 A1 | 10/2011 | Matsuo et al. ................ | 455/436 |
| 2011/0306347 A1 | 12/2011 | Choi et al. .................... | 455/438 |
| 2012/0115541 A1 | 5/2012 | Suga ............................. | 455/525 |
| 2013/0137440 A1 * | 5/2013 | Clevorn ........................ | 455/442 |

FOREIGN PATENT DOCUMENTS

GB 2482869 A 2/2012

* cited by examiner

*Primary Examiner* — Steve D Agosta
(74) *Attorney, Agent, or Firm* — Harrington & Smith

(57) ABSTRACT

Systems and techniques for handover management between adjacent cells. A base station, such as a macro base station serving a macro cell identifies a user device as a candidate for handover based on specified criteria and communicates a handover request to a femto base station. The femto base station evaluates specified conditions, such as energy efficiency, for the cell it is serving and allows the handover only if the handover would improve the conditions.

12 Claims, 3 Drawing Sheets

METHODS AND APPARATUS FOR HANDOVER MANAGEMENT

TECHNICAL FIELD

The present invention relates generally to wireless communication. More particularly, the invention relates to improved systems and techniques for energy efficient management of handover of user devices from one base station to another.

BACKGROUND

As the number of wireless cellular data communication devices continues to increase and as their data capabilities continue to be more and more heavily used, the demands on available infrastructure and frequencies continue to increase. The addition of infrastructure to meet demand is costly, and is becoming more and more difficult as unoccupied space suitable for placement of base stations diminishes. In addition, as saturation of available wireless communication frequencies approaches, addition of conventional infrastructure approaches a point of ineffectiveness.

In order to support the growing demand for data communication services, therefore, network operators are turning more and more to managing existing resources, particularly frequency resources, so as to increase the number of users served by the resources. One approach to increasing the number of users is the deployment of small radius cells, also known as femtocells, in an area defined by a larger cell, or macrocell. Numerous femtocells may be deployed by homes and business, which direct traffic in their vicinity to an Internet connection. In addition, cellular network operators may themselves deploy femtocells in the vicinity of a macrocell, to take on traffic that would otherwise be supported by the macrocell. A macrocell may be defined as the coverage, of a macro base station, which may be implemented as an eNodeB or eNB. A femtocell may be defined as the coverage of a lower power base station or femto access point, which may be implemented as a femto eNB. Dense deployment of femto base stations to create a dense arrangement of femtocells can substantially increase the coverage that may be provided by allowing the reuse of frequencies within a macro cell.

SUMMARY

In one embodiment of the invention, an apparatus comprises at least one processor and memory storing computer program code. The memory storing the computer program code is configured to, with the at least one processor cause the apparatus to at least, upon a request from a macro base station serving a user device, perform a first performance evaluation affecting an area served by a femto base station, wherein the evaluation presumes that the user device is served by the macro base station, perform a second performance evaluation affecting the area served by the femto base station, wherein the evaluation presumes that the user device is served by the femto base station, compare results of the first performance evaluation and the second performance evaluation, and, if the second performance evaluation indicates an improvement, cause direction of handover of the user device by the macro base station to the femto base station.

In another embodiment of the invention, an apparatus comprises at least one processor and memory storing computer program code. The memory storing the computer program code is configured to, with the at least one processor, cause, the apparatus to at least configure a message including a request for handover of a user device from a macro base station to a femto base station, examine a response from the femto base station to the macro base station indicating allowing or denying the request, wherein allowing or denying of the request is based at least in part on a determination if handover to the femto base station would improve energy efficiency of a femto cell served by the base station and configure a message directing handover of the user device if the response indicates allowing of the request.

In another embodiment of the invention, a method comprises, upon a request from a macro base station serving a user device, performing a first performance evaluation affecting an area served by a femto base station, wherein the evaluation presumes that the user device is served by the macro base station, performing a second performance evaluation affecting the area served by the femto base station, wherein the evaluation presumes that the user device is served by the femto base station, comparing results of the first performance evaluation and the second performance evaluation, and, if the second performance evaluation indicates an improvement, causing direction of handover of the user device by the macro base station to the femto base station.

In another embodiment of the invention, a method comprises configure a message including a request for handover of a user device from a macro base station to a femto base station, examine a response from the femto base station to the macro base station indicating allowing or denying the request, wherein allowing or denying of the request is based at least in part on a determination if handover to the femto base station would improve energy efficiency of a femto cell served by the base station, and configure a message directing handover of the user device it the response indicates allowing of the request.

In another embodiment of the invention, a computer-readable medium stores a program of instructions. Execution of the program of instructions by a processor configures an apparatus to at least, upon a request from a macro base station serving a user device, perform a first performance evaluation affecting an area served by a femto base station, wherein the evaluation presumes that the user device is served by the macro base station, perform a second performance evaluation affecting the area served by the femto base station, wherein the evaluation presumes that the user device is served by the femto base station, compare results of the first performance evaluation and the second performance evaluation, and, if the second performance evaluation indicates an improvement, cause direction of handover of the user device by the macro base station to the femto base station.

In another embodiment of the invention, a computer-readable medium stores a program of instructions. Execution of the program of instructions by a processor configures an apparatus to at least configure a message including a request for handover of a user device from a macro base station to a femto base station, examine a response from the femto base station to the macro base station indicating allowing or denying the request, wherein allowing or denying of the request is based at least in part on a determination if handover to the femto base station would improve energy efficiency of a femto cell served by the base station, and configure a message directing handover of the user device if the response indicates allowing of the request.

DETAILED DESCRIPTION

Figure 1:
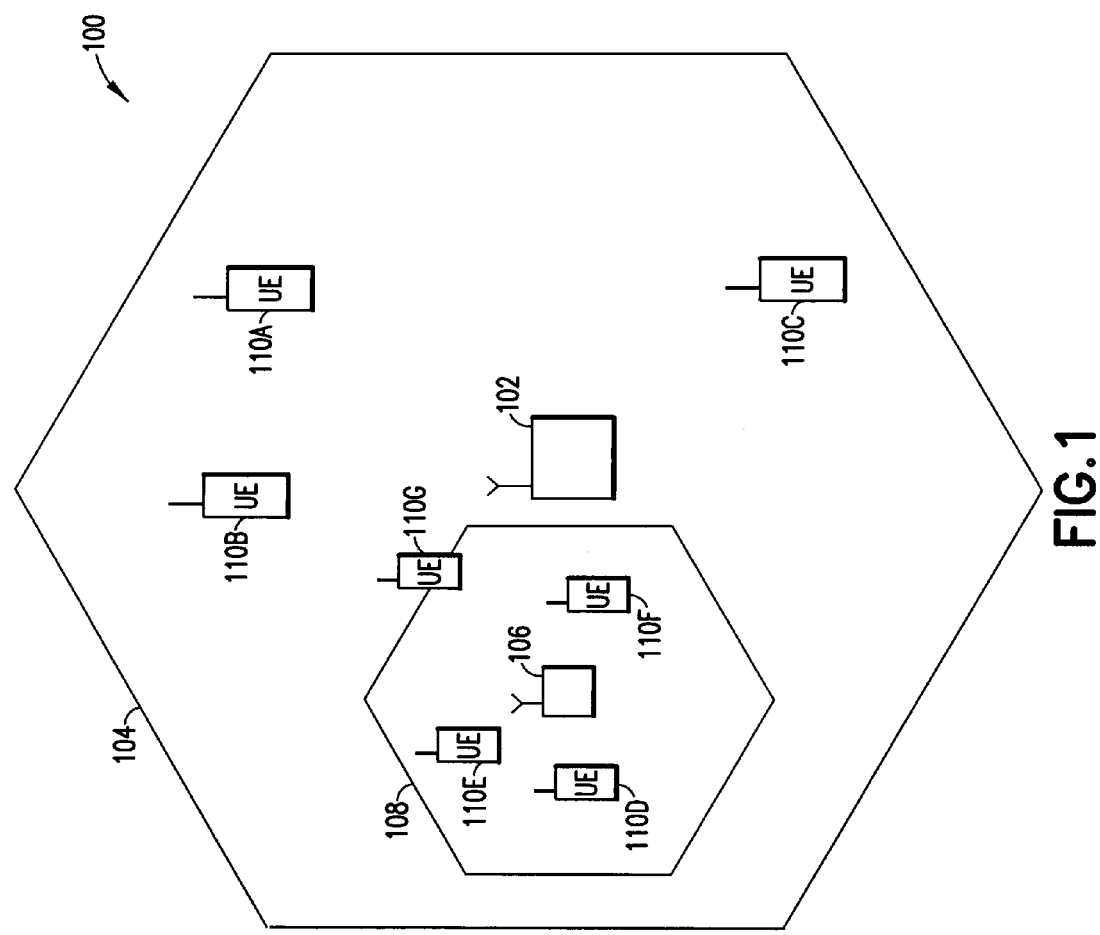
FIG. 1 illustrates a wireless communications network according to an embodiment of the present invention.

Embodiments of the present invention recognize that dense deployment of femtocells ray introduce problems such as cross tier interference and extensive unnecessary handovers between tiers. In addition, arrangements of macro- and femtocells may present challenges relating to energy efficiency of a network. A macro cell may be defined as a cell encompassing and providing coverage to a relatively wide area, particular in relation to the area encompassed and served by a femto cell. Coverage of do, ices lying within a macro cell is provided by a macro base station and coverage of devices lying within a femto cell is provided by a macro base station. Numerous femto cells may exist within the area of a macro cell, so that the coverage areas of the femto cells overlie, or are overlain by, the coverage area of the base station, and devices may be said to be "within" a femto cell or the macro cell depending whether they are assigned to the macro cell or to a femto cell.

Embodiments of the invention recognize that one form of handover process (the transfer of responsibility for a user device from one base station to another) conducted according to an open access policy commonly used in femtocell networks requires significant overhead signaling and that any reduction in the number of handovers increases network efficiency. Dense deployment, such as is found in deployment of numerous femtocells within a macrocell, presents a substantial potential for numerous handovers. Reducing the number of handovers under such circumstances can provide substantial benefits. Open access femtocells, whether provided by a home or business, or, by a cellular operator, may engage in handover processes. Closed access femtocells do not support the handover process but the quality of service of macro users in their proximity may be affected. It may be expected that a configuration of femto cells may be formed with a combination of closed and open access femtocells, so that a general reduction of handovers can be expected to provide significant gains in quality of services and network energy efficiency.

Femtocells that observe a closed access policy may generate high cross-tier interference. Macro users in the proximity of such femtocells may experience high downlink interference as the users share resources with the femtocells by are not able to use the femtocells themselves. Open access policy for femtocells allows for such femtocells to offer access to users in their vicinity without imposing any specific restrictions associated with the identity of a user, but such a policy may increase the number of handovers due to pilot power leakage from femto base stations.

If a femtocell observing a closed access policy is randomly deployed in the coverage area of a macrocell, the femtocell may its proximity region based on leakage pilot strength. An exemplary proximity region may have the same geometrical shape as the femtocell. In each cell, a set of macrocell users and a set of femtocell users may be randomly distributed, communicating with the macro base station and the femto base station, respectively. A single set of sub-channels may be shared by the macrocell and the femtocell, time shared among the users in each cell. The sets of active users in the macrocell and the femtocells may be defined by $K_m$ and $K_f$, where $K_m = \{1 \ldots m\}$ and $K_f = \{1 \ldots n\}$. The power and the time fraction allocated by the macro base station to its ith user may be defined as $p_i^{MU}$ and $t_i^{MU}$, respectively. Power and time fractions given to the ith femto user by the femto base station may be defined as $p_i^{FU}$ and $t_i^{FU}$, respectively. Path gains from the macro base station to the ith macro user and that of the femto base station to the ith femto user may be defined as $h_i^{MB}$ and $h_i^{FB}$, respectively. In addition, the path gains from the macro base station to the ith femto user and from the femto base station to the ith macro user may be defined as $g_i^{MB}$ and $g_i^{FB}$, respectively. The rate of the ith femto user is given by equation (1):

$$R_i^{FU} = t_i^{FU} \log_2\left(1 + \frac{p_i^{FU} h_i^{FB}}{\sigma 2 + \sum_{p_i \in s_m} p_i g_i^{MB}}\right)$$

where $S_m$ is the set of powers allocated to macro users within the operating duration $t_i^{FU}$ of the femto user i.

In order to evaluate the energy efficiency of a network, a metric may be defined as Joules per bit (J/bit). Based on this metric, the energy efficiency EE of the femtocell may be defined by equation (2):

$$EE_{fem}(p_i^{FU} t_i^{FU}) = \frac{\sum_{i \in K_f} p_i^{FU} t_i^{FU}}{\sum_{i \in K_f} R_i^{FU}} J/bi$$

The femto base station may execute a solution to an optimum resource allocation problem to minimize the energy consumption per bit. Equation (3) presents an example of such an execution:

$$\text{minimize} \quad \frac{\sum_{i \in K_f} p_i^{FU} t_i^{FU}}{\sum_{i \in K_f} R_i^{FU}}$$

$$\text{subject to:} \quad R_{th}^{FU} \leq R_i^{FU}, \quad (i = 1 \ldots n)$$

$$0 \leq p_i^{FU} \leq p_{max}^{FU}, \quad (i = 1 \ldots n)$$

$$\sum_i^n t_i^{FU} = T^{FU}$$

Variables are $p_i^{FU}$ and $t_i^{FU}$, where $R_{th}^{FU}$ is the rate threshold of the femto user, $p_{max}^{FU}$ is the maximum transmit power of the femto base station, and $T^{FU}$ is the time duration of one scheduling cycle at the femto base station.

FIG. 1 illustrates an exemplary network 100 according to an embodiment of the present invention. The network 100 comprises a macro base station 102 defining a macro cell 104 and a femto base station 106 defining a femto cell 108. The network 100 is illustrated here as supporting user devices 110A-110G, with the user devices 110A-110C being supported by the macro base station 102, the user devices 110D-110F being supported by the femto base station 106, and the user device 110G being near the femto base station 106. The user devices 110A-110G may suitably be implemented as, for example, user equipments or UEs. In the present example, the user device 110C, for example, is geographically distant from the femto base station 106, so that neither device affects the other's performance, even if they share frequency or time resources. The user device 110G, however, is near the femto base station 106, so that the femto base station 106 may be regarded as highly likely to degrade the performance of the user device 110G and the user device 110G may be regarded as highly likely to when the macro user is scheduled to use the resources used by the Femto cell. In such a case, it is desirable for the femto base station 106 to determine whether to take over serving the user device 110G, with the determination being based at least in part on the energy efficiency of the cell. The energy efficiency of the femtocell is evaluated before and after a handover process, with the femto base station 106 communicating with the macro base station 102 and receiving relevant information relating to the user device 110G. This information includes rate, power, and time fraction allocated to the user device 110G. Once this information is obtained, the femto base station 106 can evaluate the energy efficiency before of the user device 110G (before the handover process) according to equation 4:

$$\text{minimize} \quad \frac{\sum_{i \in K_f} p_i^{FU} t_i^{FU} + p_i^{MU} t_i^{MU}}{\sum_{i \in K_f} R_i^{FU} + R_i^{MU}}$$

$$\text{subject to:} \quad R_{th}^{FU} \leq R_i^{FU}, \quad (i = 1 \ldots n)$$
$$0 \leq p_i^{FU} \leq p_{max}^{FU}, \quad (i = 1 \ldots n)$$
$$\sum_i^n t_i^{FU} = T^{FU}$$

The variables are $p_i^{FU}$ and $t_i^{FU}$. The energy efficiency of the femtocell 108 before the handover may be designated as $EE_{fem}^0$. The femto base station 106 performs another evaluation, with the user device 110G presumed to be supported by the femto base station 106, performing resource optimization in equation (5) as follows:

$$\text{minimize} \quad \frac{\sum_{i \in K'_f} p_i^{Fu} t_i^{FU}}{\sum_{i \in K'_f} R_i^{FU}}$$

$$\text{subject to:} \quad R_{th}^{FU} \leq R_i^{FU}, \quad (i = 1 \ldots n')$$
$$0 \leq p_i^{FU} \leq p_{max}^{FU}, \quad (i = 1 \ldots n')$$
$$\sum_i^n t_i^{FU} = T^{FU}$$

Variables are designated as $p_i^{FU}$ and $t_i^{FU}$, and the new set K' is the union of the existing user set (devices 110D, 110E, and 110F), and the candidate for addition 110G. The energy efficiency of the femtocell after the handover is defined as $EE_{fem}^1$. The femto base station 106 thus determines whether or not a handover should be triggered based on a comparison between $EE_{fem}^0$, and $EE_{fem}^1$.

Figure 2:
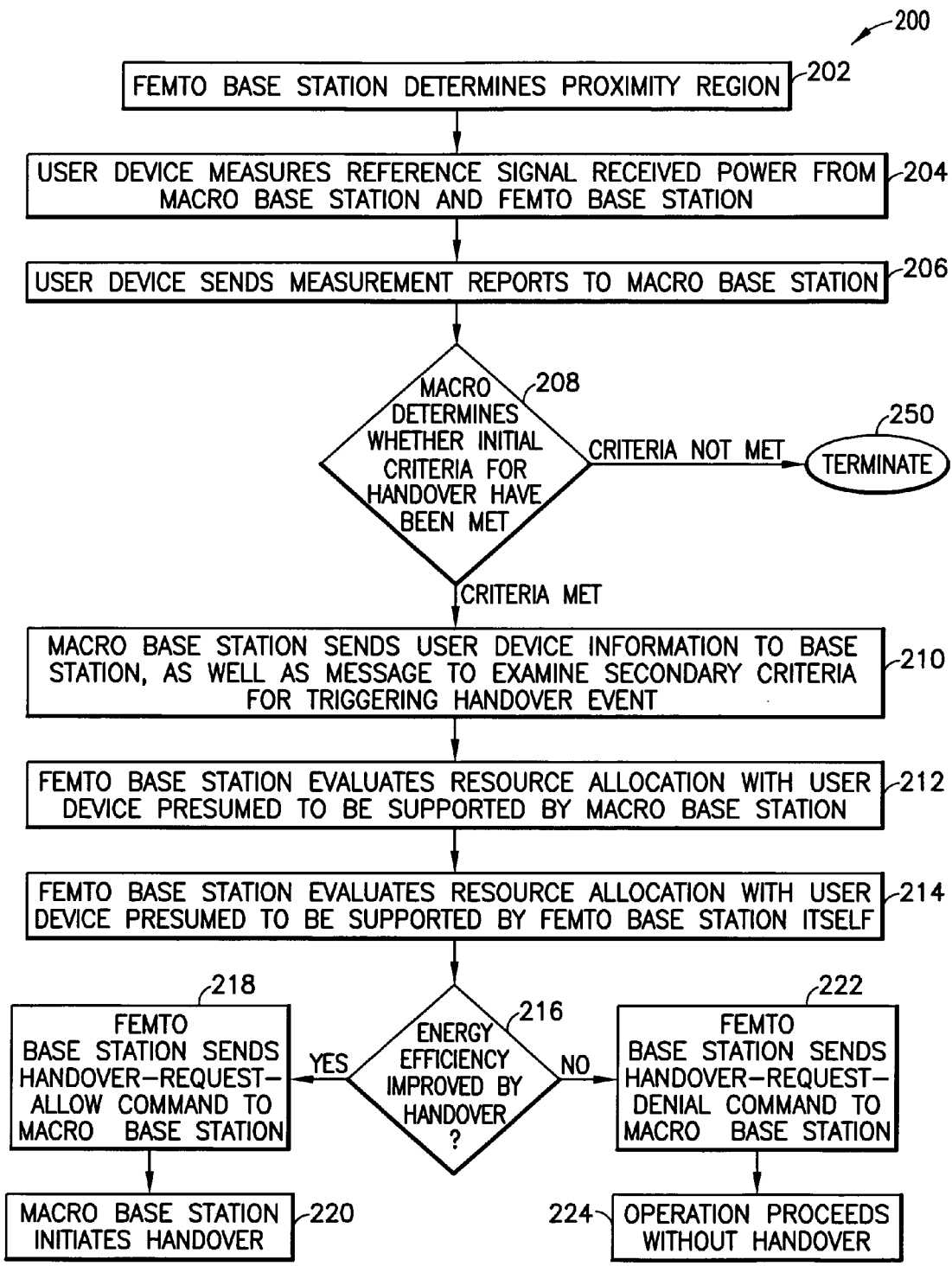
FIG. 2 illustrates a process according to an embodiment of the present invention.

FIG. 2 illustrates a handover process 200 according to an embodiment of the present invention, showing procedures undertaken by, and information exchanges between, a femto base station such as the base station 106, a user device such as the user device 110G, and a macro base station such as a macro base station 102. In the various expressions below, the user device that is a candidate for handover is identified as the user device i. At step 202, the femto base station 106 determines its proximity region. At step 204, a user device measures reference signal received power (RSRP) from the macro base station and the femto base station. At step 206, the user device sends measurement reports, such as reports of downlink reference signal transmit power and interference power, to the macro base station.

At step 208, the macro base station examines whether initial criteria for handover have been met. Criteria may be, for example, that $RSRP^{fem} > RSRP^{mac} + HM^{mac}$, where $RSRP^{mac}$ is the RSRP of the femto base station, $RSRP^{mac}$ is the RSRP of the macro base station, and $HM^{mac}$ is the hysteresis margin for the macro base station. If the criteria are not met, the process terminates at step 250. If the criteria are met, the process proceeds to step 210 and the macro base station sends a message to the femto base station to examine secondary criteria for triggering a handover event, as well as information relating to the user device, such as $R_i^{MU}$, $p_i^{MU}$, and $t_i^{PU}$. At step 212, the femto base station evaluates resource allocation with the user device presumed to be supported by the macro base station. That is, the femto base station performs the analysis presented above as equation (4) and calculates $EE_{fem}^0$. At step 214, femto base station evaluates resource allocation, with the user device presumed to be supported by the femto base station. That is, the femto base station performs the analysis presented above as equation (5) and calculates $EE_{fem}^1$. At step 216, the femto base station compares $EE_{fem}^0$ and $EE_{fem}^1$. That is, the femto base station determines if the energy efficiency would be increased by handing over the user device to the femtocell—that is, by transferring servicing of user device to the femto base station. Such a condition may be achieved if $EE_{fem}^1 > EE_{fem}^0$. If energy efficiency is improved, the process proceeds to step 218 and the femto base station sends a request-allow command to the macro base station to trigger a handover. The process then proceeds to step 220 and the macro base station sends a handover execution command to the user device. Returning now to step 216, if energy efficiency is not improved, the process proceeds to step 222 and the femto base station sends a handover request-denial command to the macro base station. The process then proceeds to step 224 and the operation proceeds.

Figure 3:
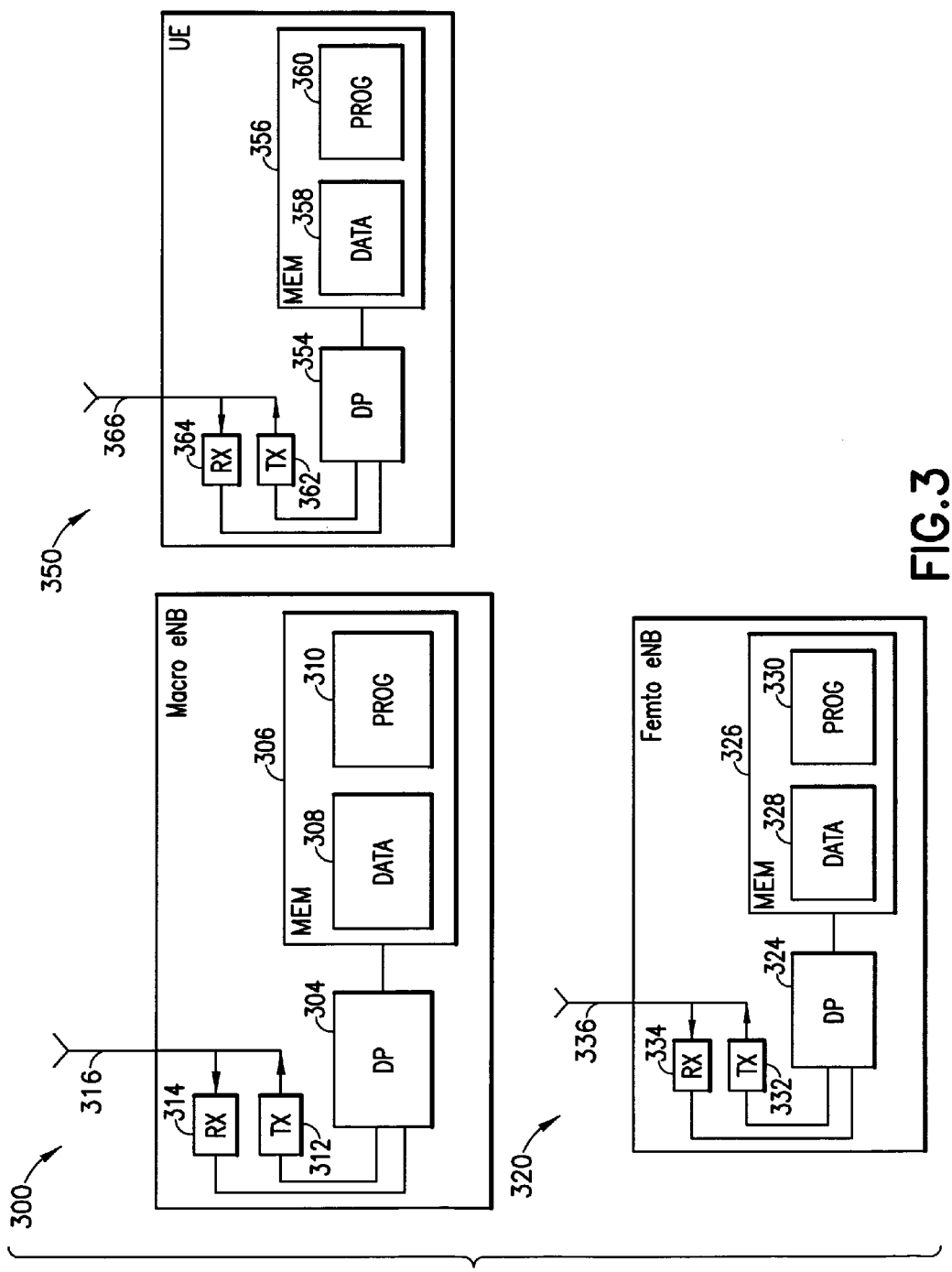
FIG. 3 illustrates elements for communicating and processing data according to an embodiment of the present invention.

Reference is now made to FIG. 3 for illustrating a simplified block diagram of a base station, such a macro base station or macro eNB 300, a femto base station or eNB 320 and a user device, such as a UE 350, suitable for use in practicing the exemplary embodiments of this invention. In FIG. 3 an apparatus, such as the eNB 300, is adapted for communication with other apparatuses having wireless communication capability, such as the UE 350.

The eNB 300 includes processing means such as at least one data processor (DP) 304, storing means such as at least one computer-readable memory (MEM) 306 storing data 308 and at least one computer program (PROG) 310 or other set of executable instructions, communicating means such as a transmitter TX 312 and a receiver RX 314 for bidirectional wireless communications with the UE 350 via an antenna array 316.

The eNB 300 includes processing means such as at least one data processor (DP) 304, storing means such as at least one computer-readable memory (MEM) 306 storing data 308 and at least one computer program (PROG) 310 or other set of executable instructions, communicating means such as a transmitter TX 312 and a receiver RX 314 for bidirectional wireless communications with the UE 350 via an antenna array 316.

The UE 350 includes processing means such as at least one data processor (DP) 354, storing means such as at least one computer-readable memory (MEM) 356 storing data 358 and at least one computer program (PROG) 360 or other set of executable instructions, communicating means such as a transmitter TX 362 and a receiver RX 364 for bidirectional wireless communications with the eNB 300 via one or more antennas 366.

At least one of the PROGs 310 in the eNB 300 is assumed to include a set of program instructions that, when executed by the associated DP 304, enable the device to operate in accordance with the exemplary embodiments of this invention, as detailed above. In these regards the exemplary embodiments of this invention may be implemented at least in part by computer software stored on the MEM 306, which is executable by the DP 304 of the eNB 300, or by hardware, or by a combination of tangibly stored software and hardware (and tangibly stored firmware). Similarly, at least one of the PROGs 330 in the femto cell 320 is assumed to include a set of program instructions that, when executed by the associated DP 324, enable the device to operate in accordance with the exemplary embodiments of this invention, as detailed above. In these regards the exemplary embodiments of this invention may be implemented at least in part by computer software stored on the MEM 326, which is executable by the DP 324 of the femto cell 320, or by hardware, or by a combination of tangibly stored software and hardware (and tangibly stored firmware). Similarly, at least one of the PROGs 360 in the UE 350 is assumed to include a set of program instructions that, when executed by the associated DP 354, enable the device to operate in accordance with the exemplary embodiments of this invention, as detailed above. In these regards the exemplary embodiments of this invention may be implemented at least in part by computer software stored on the MEM 356, which is executable by the DP 354 of the UE 350, or by hardware, or by a combination of tangibly stored software and hardware (and tangibly stored firmware). Electronic devices implementing these aspects of the invention need not be the entire devices as depicted at FIG. 1 or may be one or more components of same such as the above described tangibly stored software, hardware, firmware and DP, or a system on a chip SOC or an application specific integrated circuit ASIC.

In general, the various embodiments of the UE 350 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEM 306, 326, and 356 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 304, 324, and 354 include but are not limited to general purpose computers, special purpose computers, microprocessors, digital signal processors (DSPs) and multi-core processors.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

We claim:

1. An apparatus comprising:
   at least one processor;
   memory storing computer program code;
   wherein the memory storing the computer program code is configured to, with the at least one processor, cause the apparatus to at least:
   upon a request from a macro base station serving a user device:
      perform a first performance evaluation affecting an area served by a femto base station, wherein the evaluation presumes that the user device is served by the macro base station;
      perform a second performance evaluation affecting the area served by the femto base station, wherein the evaluation presumes that the user device is served by the femto base station;
      wherein the first and second performance evaluations comprise evaluation of energy efficiency for the area served by the femto base station, wherein the energy efficiency for the femtocell is given by $$EE_{fem}(p_i^{FU} t_i^{FU}) = \frac{\sum_{i \in K_f} p_i^{FU} t_i^{FU}}{\sum_{i \in K_f} R_i^{FU}} J/bi,$$

wherein J/bi represents Joules per bit, wherein $K_f$ is the set of users of the femtocell, wherein $R_i^{FU}$ is the rate of the ith femto user, and wherein $p_i^{FU}$ and $t_i^{FU}$ are the power and time fractions, respectively, allocated by the femto base station to the ith femto user;
   compare results of the first performance evaluation and the second performance evaluation; and
   if the second performance evaluation indicates an improvement, cause direction of handover of the user device by the macro base station to the femto base station.

2. The apparatus of claim 1, wherein the request from the macro base station is made if initial criteria for handover by the base station to the user device have been met.

3. The apparatus of claim 1, wherein the request from the base station comprises information relating to the user device and wherein the first and the second evaluation are made based at least in part on the information relating to the user device.

4. The apparatus of claim 3, wherein the information relating to the user device comprises at least one of power allocation to the user device, transmission rate allocation to the user device, and time allocation to the user device.

5. An apparatus comprising:
   at least one processor;
   memory storing computer program code;
   wherein the memory storing the computer program code is configured to, with the at least one processor, cause the apparatus to at least:
   configure a message including a request for handover of a user device from a macro base station to a femto base station;
   examine a response from the femto base station to the macro base station indicating allowing or denying the request, wherein allowing or denying of the request is based at least in part on a determination if handover to the femto base station would improve energy efficiency of a femto cell served by the base station, wherein the energy efficiency for the femtocell is given by $$EE_{fem}(p_i^{FU}t_i^{FU}) = \frac{\sum_{i \in K_f} p_i^{FU} t_i^{FU}}{\sum_{i \in K_f} R_i^{FU}} J/bi,$$

wherein J/bi represents Joules per bit, wherein $K_f$ is the set of users of the femtocell, wherein $RF_i^{FU}$ is the rate of the ith femto user, and wherein $p_i^{FU}$ and $t_i^{Fu}$ are the power and time fractions, respectively, allocated by the femto base station to the ith femto user; and configure a message directing handover of the user device if the response indicates allowing of the request.

6. The apparatus of claim 5, wherein the message including the request for handover includes information relating to the user device for use in determining whether energy efficiency would be improved by a handover.

7. A method comprising:

upon a request from a macro base station serving a user device:

performing a first performance evaluation affecting an area served by a femto base station, wherein the evaluation presumes that the user device is served by the macro base station;

performing a second performance evaluation affecting the area served by the femto base station, wherein the evaluation presumes that the user device is served by the femto base station;

wherein the first performance evaluation and the second performance evaluation comprise evaluation of energy efficiency for the area served by the femto base station, and wherein the energy efficiency for the femtocell is given by $$EE_{fem}(p_i^{FU}t_i^{FU}) = \frac{\sum_{i \in K_f} p_i^{FU} t_i^{FU}}{\sum_{i \in K_f} R_i^{FU}} J/bi,$$

wherein J/bi represents Joules per bit, wherein $K_f$ is the set of users of the femtocell, wherein $R_i^{FU}$ is the rate of the ith femto user, and wherein $p_i^{FU}$ and $t_i^{FU}$ are the power and time fractions, respectively, allocated by the femto base station to the ith femto user;

comparing results of the first performance evaluation and the second performance evaluation; and if the second performance evaluation indicates an improvement, causing direction of handover of the user device by the macro base station to the femto base station.

8. The method of claim 7, wherein the request from the macro base station is made if initial criteria for handover by the base station to the user device have been met.

9. The method of claim 7, wherein the request from the base station comprises information relating to the user device and wherein the first and the second evaluation are made based at least in part on the information relating to the user device.

10. The method of claim 9, wherein the information relating to the user device comprises at least one of power allocation to the user device, transmission rate allocation to the user device, and time allocation to the user device.

11. A method comprising:

configuring a message including a request for handover of a user device from a macro base station to a femto base station;

examining a response from the femto base station to the macro base station indicating allowing or denying the request, wherein allowing or denying of the request is based at least in part on a determination if handover to the femto base station would improve energy efficiency of a femto cell served by the base station, wherein the energy efficiency for the femtocell is given by $$EE_{fem}(p_i^{FU}t_i^{FU}) = \frac{\sum_{i \in K_f} p_i^{FU} t_i^{FU}}{\sum_{i \in K_f} R_i^{FU}} J/bi,$$

wherein J/bi represents Joules per bit, wherein $K_f$ is the set of users of the femtocell, wherein $R_i^{FU}$ is the rate of the ith femto user, and wherein $p_i^{FU}$ and $t_i^{FU}$ are the power and time fractions, respectively, allocated by the femto base station to the ith femto user; and configuring a message directing handover of the user device if the response indicates allowing of the request.

12. The method of claim 11, wherein the message including the request for handover includes information relating to the user device for use in determining whether energy efficiency would be improved by a handover.

\* \* \* \* \*